April 23, 1929.  L. F. MOODY  1,709,994

HYDRAULIC TURBINE

Original Filed May 16, 1921   2 Sheets-Sheet 1

Inventor
Lewis F. Moody
By his Attorneys
Edwards, Sager and Bower.

April 23, 1929.  L. F. MOODY  1,709,994
HYDRAULIC TURBINE
Original Filed May 16, 1921   2 Sheets-Sheet 2

Inventor
Lewis F. Moody
By his Attorneys
Edwards, Sager and Bower

Patented Apr. 23, 1929.

1,709,994

UNITED STATES PATENT OFFICE.

LEWIS F. MOODY, OF PHILADELPHIA, PENNSYLVANIA.

HYDRAULIC TURBINE.

Original application filed May 16, 1921, and renewed December 28, 1923, Serial No. 469,936. Divided and this application filed September 24, 1926. Serial No. 137,432.

This invention relates to hydraulic turbines and particularly to turbines of moderate and high specific speed. The chief object of the invention is to improve the performance and efficiency of a turbine both under normal and part gate conditions by reducing the resistance to the flow and to the rotation of the runner.

A further object of the invention is to avoid corrosion of the runner vanes caused by areas of low pressure in the flow along the rear surfaces of the vanes.

Further objects of the invention particularly in the formation of the turbine parts to maintain the air spaces between the flow and the runner vane surfaces will appear from the following description taken in connection with the accompanying drawings, in which Fig. 1 is a vertical sectional view of a portion of a turbine illustrating one embodiment of the invention;

Figure 1:
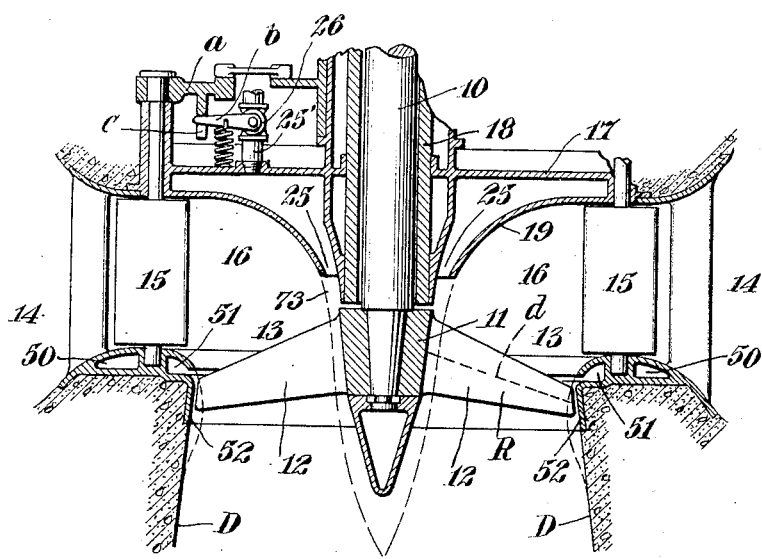

In the specific embodiment of the invention shown in the drawings, the runner R of a turbine of the reaction type has a vertical shaft 10 and a hub 11 tapering in the direction of the discharge. The runner vanes 12 extend across the passage 13 and are diagonally inclined as shown not only by the entrance and discharge edges each being diagonal but also shown more broadly by the diagonal line $d$ which is midway between the entrance and discharge edges when the blade is viewed in elevation as in Fig. 1. The flow entering by intake passage 14, preferably of the volute type, is given a whirl and passes on through inclined guide vanes 15 and into the transition space 16 where its whirl is increased and it is turned toward the axial direction and passed through the runner R at high velocity. A top casting 17 carries a bearing 18 for the shaft 10 and has a conical guiding surface 19 forming the inner wall of the transition space 16. The flow discharging from the runner R passes out through the draft tube D, which may be of the type shown or have a central core extending up into proximity to the runner. By employing a sufficiently high velocity head in the water entering the runner, the pressure head can be reduced to atmospheric or lower, so that by providing the opening 25 air will flow into the space in advance of the runner, forming a continuous body of air through the central portion of the runner surrounding its hub.

The runner vanes 12 are of simple contour extending across the flow lines and they are preferably relatively flat, deflecting the water but little and causing but little change in the amount of the velocity of the water passing through them, as is consistent with the development of a comparatively low torque and correspondingly high speed. The flow considered relatively to the runner vanes may approach closely to the flow in an impulse turbine in which there is no change in the pressure head, and (in an axial flow impulse runner) but little change in the relative velocity as the water passes through the runner. If the flow is permitted to part from the backs of the runner vanes so as to remain in contact only with the faces of the vanes a reduction in surface friction will result by keeping the water away from the back surfaces of the vane. The result is increased efficiency and may be effected with little change in the velocity relations since the flow through a high speed, light torque runner involves little change in the amount of the velocity. The driving faces of the vanes are helicoidal and of varying pitch as shown by the successive angles $a^3$, $a^2$, and $a'$ in Fig. 2. The length of the blade face is such that at any point of the blade face the line $l_x$ of intersection of the blade face with a stream line surface at said point is greater than the circumferential pitch in this stream line surface at the discharge end of the runner. The stream line surface is a surface of revolution, in the direction of flow, at all points so that it forms the boundary of any given sub-division of the flow, this surface of revolution being similar to a conical or circular surface coaxial with the runner axis. The length of the line of intersection of this surface with the blade face is such that if placed circumferentially on the circular surface and at right angles to the runner axis, this line would include the distance between the discharge edges of successive vanes measured circumferentially on the circular surface. It is also to be noted as shown in Fig. 2 that the blades have a portion which with respect to a radial plane, which is a plane normal to the runner axis, lie within an angle not substantially greater than 30°.

Figure 2:
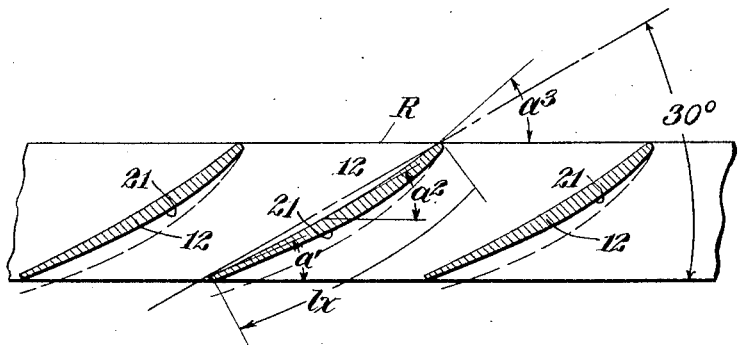
Fig. 2 is a diagrammatic sectional view through the runner vanes.

The separation of the flow from the back surfaces of the vanes 12 may be effected by the angle and contour of the vane surfaces with relation to the flow (Fig. 2). The spaces 21 at the backs of the vanes will then be filled with air and the flow will be separated from these back surfaces, not only reducing the surface friction but also avoiding pitting and corrosion of said surfaces. When the flow is not permitted to leave these surfaces there is a decided tendency for the water to lower its pressure along them at such a rapid rate that the stream parts from the surface leaving eddying water in contact with the vane and creating backward flow and eddies and causing rapid corrosion and wear.

A further advantage of the separation of the flow from the vane surfaces is the improvement of part gate efficiencies due to the filling of the space behind each vane by air instead of water in an eddying, turbulent condition. In furtherance of this advantage it may also be desirable to permit the water to part from either one or both of the walls of the passage 13 in which the runner is located. For instance, air may be introduced around the runner shaft by passages 25 and this will serve to supply the spaces behind the runner vanes and at part gate the flow will be formed with a free surface surrounding the turbine axis, the space within this surface being filled with air and not with eddying water as would be the case without an air inlet. When there is no such air admission the water is obliged to fill the entire space even when this involves sudden enlargement of the stream's cross-section, and under off-normal conditions of operation this causes eddies and backward flow at some points. With air admission the water can maintain its natural velocity and contract to the stream cross-section required by this velocity, thus adjusting the area of the stream cross-section to the amount of water admitted, the remainder of the space within the enclosing walls being filled with air. It will also be desirable to provide the air supply connections with check valves closing whenever the pressure of the water rises above atmospheric so as to prevent a backward flow into the air supply, and opening whenever the water pressure drops so as to draw in air. In many cases, it will be advantageous to admit air to the runner up to some definite gate opening and beyond this point to close the air inlet and operate at larger gate openings as a reaction turbine. For this purpose the air inlet 25' may be provided with means such as valve 26 with connections to close the valve at some definite gate opening. For instance, these connections may comprise a cam $c$ on arm $a$ of the wicket gate 15 moving the arm $b$ of valve 26 to control the valve.

In the admission of air around the runner it may be desirable to provide an air space around the tips of the runner vanes either in addition to or instead of the central air supply around the hub. For instance, in Fig. 1 an air supply passage 50 may be provided having openings 51 leading into the turbine conduit adjacent the tips of the runner vanes. Such an air supply will maintain an air space 52 around the runner tips reducing friction and serving to supply air to the spaces at the backs of the vanes. Such an air space will also aid in reducing wasteful eddying of the flow under part gate conditions and thus increase the efficiency of the turbine.

Figure 3:
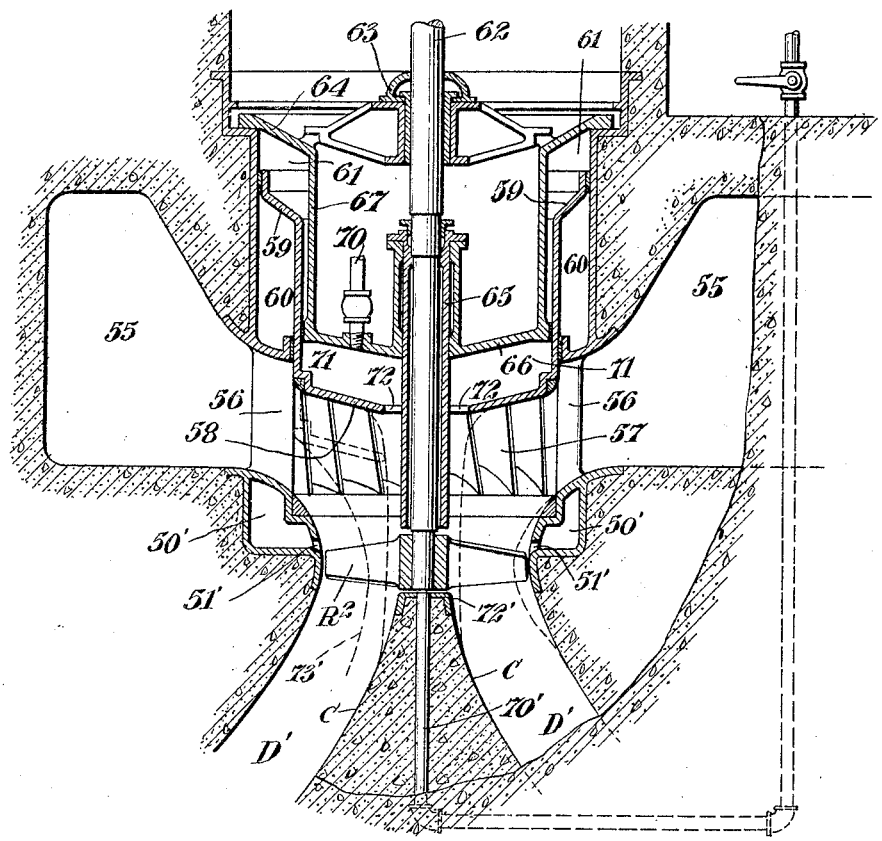
Fig. 3 is a sectional view similar to Fig. 1 but with portions indicated in different planes, and illustrating a modification.

In Fig. 3 a modified form of turbine is shown in which the flow enters by volute 55 and passes with a whirl through the fixed vanes 56 into transition space 57 wherein the whirling flow is turned toward the axial direction onto the runner $R^2$, from which it discharges into draft tube D' having a central core C extending into proximity with the runner. The flow to the runner is controlled by the plunger gate 58 sliding in the stay vane ring 56 and having the piston portion 59 moved by fluid pressure in spaces 60, 61. The shaft 62 of the runner $R^2$ has a bearing 63 in cover 64 and passes down through a sleeve 65 suspended from the end 66 of the stationary cylinder 67. An air supply pipe 70 opens into the space 71 between the cover 66 and plunger gate 58 and this gate has a central opening 72 through which the air is drawn around the sleeves 65 down to the runner vanes, forming a central air space for the whirling vortex of the inflow in transition space 57. This central air supply is particularly advantageous in this plunger gate type of turbine in permitting the flow in the transition space to have a free surface 73 at the center. As the gate 58 is closed and the flow is restricted the water does not have to fill the transition space but passes therethrough as a smooth annular stream with central free surfaces 73' within which is an air space. At part gate therefore restriction of the flow will be attained by the enlarging of the central air space or core and the free surface of the stream will recede outward away from the axis. In this way sudden enlargement of the stream and the resultant wasteful disturbances are avoided and smooth, efficient conditions of flow are maintained at all gate openings.

In the arrangement of Fig. 3, air admission may also be provided around the outer wall of the transition space as in the Fig. 1 arrangement. Passages similar to 50, with openings 51, shown in Fig. 1 would be used for this purpose (as shown at 50', 51'), either in addition to or instead of the openings 72.

By means of these openings the flow would be permitted to spring clear of the outer wall, as shown at 73².

It is desirable to regulate the entrance of air and to restrict it to a rate only sufficient to maintain continuous air spaces in and around the runner without causing an undue amount to enter into suspension in the water and to pass on with it. Air which becomes mixed with the water and flows away with it reduces the effectiveness of the draft tube to some extent.

In some cases where the runner is placed below or near the tail water, a rise in the tail water level may tend to submerge the runner, and in such event the air supply may be closed and the turbine operated as a reaction turbine. Sometimes, however, where the entrance pressure is above atmospheric because of abnormally high tail water or for other reasons, it may be advantageous to put pressure on the air supply to raise it sufficiently above atmospheric to overcome the water pressure and to maintain the air spaces as desired.

When a central core is used in the draft tube as in Fig. 3, air may be admitted to the draft tube below the runner to form a central air space through a pipe or passage 70' and opening 72' shown in lines carried up through the core C, either in addition to or instead of the pipe 70 and openings 72. The air space thus supplied from below the runner will under part load conditions usually extend upward into the runner, this action being promoted by the reversal of flow which occurs in most runners in the portion near the axis during part gate operation, the flow in this region then being upward. The passage 70', 72', will in general be provided with valve control means similar to all of the air inlets previously described.

A further purpose and advantage of admitting air to the draft tube, either directly or through the runner, is the avoidance of the vibration or surging which sometimes results from the formation of eddies or cavities within the draft tube.

This application is a division of the copending application of Lewis F. Moody, Serial No. 469,936, filed May 16, 1921 and renewed December 28, 1923 for hydraulic turbine, patented November 16, 1926, No. 1,606,887.

I claim:

1. The combination in a hydraulic turbine comprising means forming a conduit turning from a radial to an axial direction and terminating in a flow decelerating draft tube, movable guide vanes disposed in said radial portion for whirling the flow passing into said axial portion, and a propeller type runner so disposed with respect to said axial portion as to receive an axial flow and spaced from said guide vanes so as to form a transition space, said runner having blades of such a length that at any point of a blade the line of intersection of the blade with a stream line surface passing through said point is equal to or greater than the circumferential distance between corresponding points on successive blades, the surface of a blade along said intersection being so shaped that with reference to a radial plane the angles of the surface near the entrance and discharge edges are different.

2. The combination in a hydraulic turbine comprising means forming a conduit turning from a radial to an axial direction and terminating in a flow decelerating draft tube, movable guide vanes for whirling inflow through said radial portion, and a propeller type runner so disposed with respect to said axial portion as to receive an axial flow and spaced from said guide vanes so as to form a transition space in which the flow turns from radial to axial, said runner having blades of such a length that at any point of a blade the line of intersection of the blade with a stream line surface passing through said point is equal to or greater than the circumferential distance between corresponding points on successive blades, the blade surface along said intersection being curved substantially entirely between the entrance and discharge edges of the blade, which is inclined at a relatively small angle to the direction of runner rotation.

3. The combination in a hydraulic turbine comprising means forming a conduit turning from a radial to an axial direction and terminating in a flow decelerating draft tube, movable guide vanes for whirling inflow through said radial portion, and a propeller type runner so disposed with respect to said axial portion as to receive an axial flow and be spaced from said guide vanes so as to form a transition space, said runner having blades with driving faces of varying pitch and of such a length that at any point of the blade the line of intersection of the blade with a stream line surface passing through said point is equal to or greater than the circumferential distance between corresponding points on successive blades.

4. The combination in a hydraulic turbine comprising means forming a conduit turning from a radial to an axial direction and terminating in a flow decelerating draft tube, movable guide vanes for whirling inflow through said radial portion, and a propeller type runner so disposed with respect to said axial portion as to receive an axial flow and be spaced from said guide vanes so as to form a transition space, said runner having blades with driving faces of varying pitch and of such a length that at a point of the blade the line of intersection of the blade with a stream line surface passing through said point is equal to or greater than the circumferential distance between corresponding points on successive blades and that said blade along said intersection has an inclination with respect to a radial plane that falls within an angle not substantially greater than 30°.

5. In a hydraulic turbine, a conduit enclosed by a casing, comprising a radial flow portion, an axial flow portion terminating in a flow decelerating draft tube, a transition space in which the flow changes from radial to axial, inward flow guide vanes in said radial flow portion, and an unshrouded propeller runner in said axial flow portion receiving an axial flow and having blades of such a length that at any point of a blade the line of intersection of the blade with a stream line surface passing through said point is equal to or greater than the circumferential distance between corresponding points on successive blades, a portion of a blade along said intersection being tapered toward the discharge edge of the blade.

6. In a hydraulic turbine, a conduit enclosed by a casing, comprising a radial flow portion, an axial flow portion terminating in a flow decelerating draft tube, a transition space in which the flow changes from radial to axial, inward flow movable guide vanes in said radial flow portion, and an unshrouded propeller runner in said axial flow portion having blades extending across the axial flow portion so as to receive an axial flow, and of such a length that at any point of the blade the line of intersection of the blade with a stream line surface passing through said point is equal to or greater than the circumferential distance between corresponding points on successive blades and that the blade, at least along one intersection, makes an angle with a radial plane not greater than substantially 30°.

7. In a hydraulic turbine, the combination with a conduit including an entrance passage and guide means for directing the flow to the runner, of means for admitting air to said conduit, and a runner with slightly overlapping blades having back surfaces formed to direct and cause the separation of the flow from said back surfaces.

8. In a hydraulic turbine, a propeller runner having unshrouded, overlapping blades provided with driving faces of varying pitch, and means for directing an axial flow to said runner, movable guide vanes for whirling the inflowing fluid to said runner and spaced therefrom to form a transition space in which the fluid is turned from a radial to an axial direction, said blades being of such a length that at any point of a blade the line of intersection of the blade with a stream line surface passing through said point is equal to or greater than the circumferential distance between corresponding points on successive blades at the discharge end of the runner, and a radial entrance passage having an axial width which is equal to or greater than the radial width of the runner passage between the runner hub and surrounding wall.

9. In a hydraulic turbine, means forming a conduit turning from a radial to an axial direction and terminating in a flow decelerating draft tube, inward flow guide vanes for whirling the flow passing into said radial portion, and an axial flow high specific speed propeller runner having at least its major portion disposed in the axial portion of said conduit and spaced from said guide vanes to form a transition space in which the flow is turned from a radial to an axial direction, said runner having a hub carrying successive blades which are so disposed that the discharge edges near the outer part of the blades are in a radial plane which lies substantially outside the blades near the hub and at least a portion of the adjacent entrance and discharge edges of successive blades being disposed relatively close to a common meridian plane, said blades also being relatively flat in the direction of flow thereover and each having a portion whereby the line of intersection between said blade portion and a circular surface coaxial with the runner falls within an angle not greater than substantially 30° with respect to a radial plane.

10. A structure as set forth in claim 9, wherein the thickness of the blade along said intersection tapers toward the discharge edge of the blade.

11. A structure as set forth in claim 9 wherein the guiding surfaces of the blades are substantially helicoidal.

12. A structure as set forth in claim 9 wherein the blade tips are unshrouded and fall within an angle of substantially 30° with respect to a radial plane.

13. The combination in a hydraulic turbine comprising means forming a conduit turning from a radial to an axial direction, said axial portion including a flow decelerating draft tube, a high specific speed propeller type runner disposed in said conduit and having blades which are relatively flat in the direction of flow thereover, adjustable guide vanes also disposed in said conduit for controlling and whirling flow to said runner, said vanes and runner being spaced apart to form a transition space, and means for admitting air to said conduit.

14. The combination in a hydraulic turbine comprising means forming a turbine casing and a conduit turning from a radial to an axial direction, said axial portion including a flow decelerating draft tube, and a high specific speed propeller type runner disposed in said conduit and having blades which are relatively flat in the direction of flow thereover, adjustable guide vanes also disposed in said conduit for controlling and whirling flow to said runner, said vanes and runner being spaced apart to form a transition space, and means for permitting passage of air within said casing from a point above said runner to a point in said conduit adjacent said runner.

15. The combination in a hydraulic turbine comprising means forming a conduit turning from a radial to an axial direction, said axial portion including a flow decelerating draft tube, a high specific speed propeller type runner disposed in said conduit, vanes also disposed in said conduit and spaced from said runner to form a transition space having constant volume during variations in the volume of fluid flow through said conduit, and means for admitting air to the axial portion of said conduit adjacent said runner.

16. The combination in a hydraulic turbine comprising means forming a conduit turning from a radial to an axial direction, said axial portion including a flow decelerating draft tube, while that portion of the conduit which turns from radial to axial has an inner stationary wall constituting substantially a curved surface of revolution, a runner and guide vanes disposed in said conduit and spaced apart to form a transition space which is bounded on its inner side by said surface of revolution, and stationary means for admitting air adjacent to said runner and the central portion of the draft tube entrance, said stationary means being surrounded by said wall.

17. The combination in a hydraulic turbine comprising means forming a conduit turning from a radial to an axial direction, said axial portion including a flow decelerating draft tube, while that portion of the conduit which turns from radial to axial has an inner stationary wall constituting substantially a curved surface of revolution, a runner and guide vanes disposed in said conduit and spaced apart to form a transition space which is bounded on its inner side by said surface of revolution, and stationary means for admitting air adjacent to said runner and the draft tube entrance.

18. The combination in a hydraulic turbine comprising means forming a conduit turning from a radial to an axial direction, the axially directed portion of said conduit including a flow decelerating draft tube, a high specific speed propeller type runner disposed in said conduit and having blades which are relatively flat in the direction of flow thereover, guide vanes also disposed in said conduit for whirling the flow to said runner and spaced therefrom to form a transition space having constant volume during flow variations to the runner, and means permitting admission of air to the central portion of said draft tube adjacent to said runner, including an air passage having communication with said conduit only at points adjacent to said runner.

19. The combination as set forth in claim 17 wherein said air passage is bounded on its outer sides and at its uppermost portion by fixed walls extending generally in a downward axial direction for a substantial distance below a radial plane containing the uppermost part of the radial portion of said conduit.

20. In a hydraulic turbine, means forming a conduit turning from radial to an axial direction and terminating in a flow decelerating draft tube, inward flow movable guide vanes for whirling the flow passing into said radial portion, and an axial flow propeller runner having its major portion disposed in the axial portion of said conduit and spaced from said guide vanes to form a transition space, said runner having successive blades so disposed that when viewed in elevation an outwardly extending line drawn midway between the entrance and discharge edges of a blade will extend diagonally with respect to the runner axis and at least a portion of the adjacent entrance and discharge edges of successive blades will be disposed relatively close to a common meridian plane, each of said blades also having a portion whereby the line of intersection between said blade portion and a circular surface coaxial with the runner falls within an angle not greater than substantially 30° with respect to a radial plane.

LEWIS F. MOODY.